United States Patent Office 3,060,033
Patented Oct. 23, 1962

3,060,033
ROSE FLAVORING FOOD ADDITIVE
Jiray Ermarkaryan, Izzetpasa Sok. 41, Sisli, Bononti, Istanbul, Turkey
No Drawing. Filed June 2, 1961, Ser. No. 114,305
9 Claims. (Cl. 99—140)

This invention relates to a rose flavoring food additive, and to a method of preparing and of using such a rose flavoring additive.

It is well known in the food industry to extract the essential oils of various flora for use as flavoring agents in food products; such as, for example, lemon oil and apple essence. It is also known that the flavors must be protected both against loss by evaporation and decomposition by oxidation and/or heat. The use of flavoring agents, with and without preservatives, in food products such as conserves, jellies, jams, ice cream and pastries is also well known.

The principal object of this invention is the preparation of rose flavoring food additive which will serve as a convenient source of flavor and which may be stored for long periods of time without loss or deterioration of the flavoring components.

A further object of this invention concerns a rose flavored food product which is prepared by incorporating the rose flavoring food additive in a base food. These and further objects and advantages are explained in more detail hereinafter.

The rose flavoring food additive prepared in accordance with this invention comprises a mixture of rose petals and sugar. This additive is preferably prepared by mixing the petals of the *Rosa demascena trigintipetala* Dieck and sugar in a weight ratio of from about 3 parts of rose to 2 parts of sugar to about 1 part of rose to 2 parts of sugar; that is the sugar content of the additive may be from about 40% to about 65% by weight, the rose petals constituting the balance of the additive. The preparation requires no heat. The addition of other preservative materials is unnecessary. The preparation is essentially a dry mixing process in which the sugar and the rose petals are thoroughly intermixed.

The additive, thus prepared, may be stored for up to six years without any sign of deterioration merely by placing the additive in a clean container and hermetically sealing the container. The container must be sealed in order to keep the composition free from extraneous contaminants, prevent loss of the etheric essence, and prevent entry of fermentation organisms.

The only species of rose which may be used in carrying out this invention is the *Rosa demascena trigintipetala* Dieck. This species of rose was cultivated in south eastern Europe prior to 1850 and is grown primarily for making attar, or the fragrant volatile essential oil of the rose. The *Rosa demascena trigintipetala* Dieck is described by J. Horace McFarland at page 336 of Modern Roses, vol. 1958, McFarland Co. This species of the Damascus rose is grown as an agricultural crop in Isparta, Turkey. Although, attempts have been made to cultivate this species in other parts of the world, it has been found that the climate, topography, and soil found around Isparta are eminently suitable for the growth of this rose.

The *Rosa demascena trigintipetala* Dieck is unique, not only in that it grows in a geographically limited area, but in that the flavor and ordor peculiar to this rose can be preserved by combining the petals of the full grown rose blossom with sugar.

It is essential to this invention that only the full blossoms are used to obtain the rose petals, but it is also essential that the petals be newly grown, that is, the petals should not be old and wilted. The *Rosa demascena trigintipetala* Dieck blooms in the latter part of May and early June of the year. During this season, the roses are picked daily, preferably before 10 a.m. Exposure to the light of the strong noon day sun causes a large portion of the etheric essence to evaporate, thereby reducing the flavoring capacity of the rose petals. These roses must be picked daily by hand in order to assure the maximum flavoring capacity.

The proportions of the rose petals and sugar which are used to make the rose flavoring additive are critical within certain limits. As is mentioned above the preferred proportions are in a weight ratio of rose petals to sugar of from 3:2 to about 1:2; that is, the additive contains from about 40 to 65% sugar by weight, and from about 60 to 35% rose petals by weight. These proportions may be varied somewhat, but it is essential that at least 10% by weight of the rose flavor additive be sugar, the remaining 90% being rose petals, in order to provide protection for the rose flavoring constituents as to decomposition. The proportion of sugar may be substantially more than 65% by weight and may range as high as 90% by weight, the remaining 10% being rose petals, for such increases will merely serve to dilute the flavoring throughout the sugar. Proportions of sugar of from 40% to 65% by weight are preferred since such proportions provide the requsite protection against decomposition and at the same time minimize the bulk of the additive, thus reducing handling and transportation expenses.

The term sugar, as used in this application, embraces both cane sugar and beet sugar and may be in the form of lumps, as found in granulated sugar, or in the form of powder.

Once the flavoring additive has been prepared, it may be stored for later use or may be shipped as an article of commerce. This flavoring additive has been stored, without any decomposition or loss of flavoring power for up to six years under normal storage conditions (not involving any temperature or humidity controls).

The following example gives various modes which are the best for carrying out this invention. It will be seen that by varying the rose to sugar ratios, the length of effective preservation is varied.

Example I

The *Rosa demascena trigintipetala* Dieck is harvested in the latter part of May from the fields surrounding Isparta, Turkey. Early in the morning, the rose is plucked from the stem by hand and without the use of a knife or scissors. The rose is placed in the palm of the hand, and the petals are separated from the stem by blowing into the palm. The petals are collected in large baskets and taken to the processing area where the rose petals are mixed with sugar. Fifty parts by weight the petals of the *Rosa demascena trigintipetala* Dieck and fifty parts by weight of granulated sugar are intermixed by hand. The mixture is kneaded by hand until a homogeneous blend of the rose and sugar is obtained. The mixture is then placed in tinned cans and hermetically sealed in the cans. This rose flavoring food additive may be stored from three to four years without decomposition or loss of flavor.

Example II

Using the technique described in Example I, 40 parts by weight of sugar and 60 parts by weight of rose are mixed and sealed in tinned containers. This rose flavoring food additive may be stored for 2 years without decomposition or loss of flavor.

Example III

Using the technique described in Example I, 65 parts by weight of sugar and 35 parts by weight of rose are mixed and sealed in tin containers. This rose flavoring food additive may be stored for about five to six years without decomposition or loss of flavor.

The mixing of the sugar and rose petals may be carried out by machine as well as by hand. It is imperative that the machine exerts a gentle mixing action in order that the rose petals are not damaged.

The proportions of rose petals to sugar used in carrying out this invention will depend upon the length of time for which the rose flavoring additive is to be stored. As the proportions are varied to obtain longer effective storage, the higher proportion of sugar causes the additive to weight more per flavor unit, thus increasing transportation costs. In practice the proportions will be selected by balancing the additional transportation costs against the required length of time in storage.

The rose flavoring additive may be used in a wide variety of food products such as Turkish delight, rose liqueur and other aqueous based foods, with jams or jellies being the preferred type food product. Since the flavoring components of the additive are fairly volatile, the use of the additive in pastries or other products which require extensive heating to prepare, is limited in that the additive must be in the form of a jelly or other aqueous environment. The rose flavoring additive may be used with auxiliary flavoring agents, preservatives and such other ingredients as will be obvious to those skilled in the art.

A rose flavored jam may be prepared in the following manner:

Example IV 750 grams of water are placed in a copper pot and heated to about 50° C. 250 grams of the rose flavoring additive, prepared as described in Example I, are placed in the water and the heating is continued until the mixture is boiling. 1250 grams of sugar are then added with sufficient mixing to dissolve all the sugar. 1250 grams of glucose are then added and the mixture is again boiled. The proper consistency is established by holding the mixture at a temperature of about 105° C. to 110° C. At this point 2 grams of lemon powder dissolved in water is added in order to reduce crystallization and add to the transparency of the product.

It is not necessary to employ a copper pot in which to produce the jam. Any vessel which is inert with respect to the foods and not harmful to the health of the consumer may be used.

The consistency of the jam or jelly products may vary widely, not only with personal tastes, but with the season of the year in which the jam is produced. It has been found desirable to establish the consistency of the jam, as prepared in Example IV, at about 37°–38° Baumé during the summer season and 35°–36° Baumé during the winter season.

I claim:

1. A rose flavoring food additive which comprises the petals of the *Rosa demascena trigintipetala* Dieck and sugar.

2. A rose flavoring food additive which comprises from about 10 to about 90 parts by weight of the petals of the *Rosa damascena trigintipetala* Dieck and from about 90 to about 10 parts by weight of sugar.

3. A rose flavoring food additive which comprises from about 35 to about 60 parts by weight of the petals of the *Rosa demascena trigintipetala* Dieck and from about 65 to about 40 parts by weight of sugar.

4. A method of preparing a rose flavoring food additive in which the flavoring component is protected from deterioration which comprises combining petals of the *Rosa demascena trigintipetala* Dieck and sugar.

5. A method of preparing a rose flavoring food additive in which the flavoring component is protected from deterioration, which comprises combining from about 10 to about 90 parts by weight of the petals of the *Rosa demascena trigintipetala* Dieck and from about 90 to about 10 parts by weight of sugar.

6. A method of preparing a rose flavoring food additive in which the flavoring component is protected from deterioration, which comprises combining from about 35 to about 60 parts by weight of the petals of the *Rosa demascena trigintipetala* Dieck and from about 65 to about 40 parts by weight of sugar.

7. A method of preparing a rose flavoring additive in which the flavoring component is protected from evaporation and deterioration which comprises combining the petals of the *Rosa demascena trigintipetala* Dieck and sugar and placing the combination in a hermetically sealed container.

8. A method of preparing a rose flavoring food additive in which the flavoring component is protected from evaporation and deterioration which comprises combining from about 10 to about 90 parts by weight of the petals of the *Rosa demascena trigintipetala* Dieck and from about 90 to about 10 parts by weight of sugar and placing the combination in a hermetically sealed container.

9. A method of preparing a rose flavoring food additive in which the flavoring component is protected from evaporation and deterioration which comprises combining from about 35 to about 60 parts of weight of the petals of the *Rosa demascena trigintipetala* Dieck and from about 65 to about 40 parts by weight of sugar and placing the combination in a hermetically sealed container.

References Cited in the file of this patent

UNITED STATES PATENTS

| | | |
|---|---|---|
| 752,359 | Reed | Feb. 16, 1904 |

FOREIGN PATENTS

| | | |
|---|---|---|
| 4,966 | Great Britain | 1915 |
| 696,336 | Great Britain | Aug. 26, 1953 |

OTHER REFERENCES

"The Chemical Senses," by Moncrieff, Leonard Hill Limited, 17 Stratford Place, W 1, London, 1944, pages 319 and 320.

"News Scripts," Chemical and Enginering News 1950, page 3462.